United States Patent [19]

Moore

[11] Patent Number: 4,619,110
[45] Date of Patent: Oct. 28, 1986

[54] HELICOPTER ENGINE WARNING OR CONTROL SYSTEM

[76] Inventor: M. Samuel Moore, 11623 Seminole Cir., Northridge, Calif. 91324

[21] Appl. No.: 729,547

[22] Filed: May 2, 1985

Related U.S. Application Data

[63] Continuation-in-part of Ser. No. 513,458, Jul. 13, 1983, abandoned.

[51] Int. Cl.$^4$ .............................................. F02C 9/28
[52] U.S. Cl. ............................... 60/39.091; 60/39.281
[58] Field of Search ............. 60/39.091, 39.281, 39.05, 60/39.53, 39.55

[56] References Cited

U.S. PATENT DOCUMENTS

| | | | |
|---|---|---|---|
| 3,021,673 | 2/1962 | Mock | 60/39.55 |
| 3,924,262 | 12/1975 | Melancon | 340/328 |
| 3,979,717 | 9/1976 | Barnum et al. | 244/17.13 |
| 4,060,793 | 11/1977 | Bateman | 340/970 |
| 4,115,755 | 9/1978 | Cotton | 244/17.13 |
| 4,115,998 | 9/1978 | Gilbert et al. | 60/39.091 |
| 4,206,829 | 6/1980 | Melocik | 340/331 |
| 4,218,878 | 8/1980 | Kiscaden et al. | 60/39.091 |
| 4,293,840 | 10/1981 | Hadari | 244/17.13 |
| 4,524,620 | 6/1985 | Wright et al. | 416/61 |

Primary Examiner—Louis J. Casaregola
Attorney, Agent, or Firm—Poms, Smith, Lande & Rose

[57] ABSTRACT

A helicopter turbine engine over-stress warning and protection system includes arrangements for sensing the engine temperature, the engine speed, and the output torque from the engine. An audible signal warning is provided which may vary as the over-stress limits are approached. For example, when the helicopter engine is at or above the over-stress limits, it may have a constant fairly loud tone into the pilot's earphones or into a speaker in the cockpit. This warning tone signal becomes interrupted and provides progressively greater periods of silence as the helicopter engine drops below the over-stress limits. The warning signal stops at a pre-set point such as, for example, when the engine is being operated from 5% to 15% below the over-stress limits. Dynamic response control circuits are provided to avoid false actuation of the alarm system; automatic limitation of the fuel flow to the engine may be provided in combination with a conveniently located over-ride actuator; and arrangements may also be provided for automatically injecting water or alcohol into the engine as over-stress conditions are approached.

10 Claims, 9 Drawing Figures

4,619,110

HELICOPTER ENGINE WARNING OR CONTROL SYSTEM

RELATED APPLICATIONS

This patent application is a continuation-in-part of U.S. patent application Ser. No. 513,458 filed July 13, 1983 (abandoned).

FIELD OF THE INVENTION

This invention relates to helicopter engine over-stress warning and/or limiting, protection systems.

BACKGROUND OF THE INVENTION

Helicopter engines should normally be operated below certain predetermined levels of temperature, output torque, and engine speed, and for convenience, the critical limits for these factors will be called the "over-stress" limits. If a helicoptor engine is operated above these limits, its life may be drastically shortened, and expensive overhaul of the engine may be required. If these engine limits are exceeded for long periods of time, the engine may fail, with possibly drastic consequences. Helicopter pilots normally operate the engine well below these over-stress limits. However, when a pilot's attention is concentrated on his work, such as lifting a load with a sling, or operating into or out of tight quarters, his attention is normally required away from the cockpit instrumentation, and it is quite possible that engine limits may be inadvertently exceeded under this type of condition.

It is an important object of the present invention to provide a warning and alternatively a control system especially designed for helicopters.

It is noted in passing that turbine engine warning and control systems have been proposed heretofore for conventional turbine aircraft; however, these prior systems were not suitable for or applicable to the special conditions presented in helicopter operations.

SUMMARY OF THE INVENTION

In accordance with the present invention, a helicopter engine over-stress warning and protection system may include arrangements for sensing the temperature, the speed, and the output torque of a helicopter engine. An audio signal system connected to the pilot's earphones or to a speaker in the cockpit of the helicopter is initially actuated to provide a slow beeping tone, when the engine comes within 5% or 15% of the over-stress limits. As the over-stress limits are approached, the length of the pulses may be increased, and their intensity also increased, if desired, until, at the over-stress limit itself, the pulses merge into a continuous tone.

In considering other aspects of the invention, they may include the following:

A. The audible signal may be in a different changing format, such as changing volume, or a different programmed message, with urgency increasing as the over-stress limits are approached or exceeded.

B. The fuel flow to the helicopter engine may be automatically controlled and limited so that over-stress limits are not exceeded.

C. An override switch may be mounted on the helicopter pilot's cyclic control lever for ease in overriding the over-stress limits under emergency conditions.

D. Dynamic response control circuitry may be provided in the system so that brief excursions of the input signal above the limits will not trigger a false alarm. This might otherwise occur in the case of a "jump stop" or the like.

E. Automatic water and/or alcohol injection into the helicopter turbine engine may be provided as the over-stress limits are approached or exceeded, to keep the temperature under control and protect the engine.

Other objects, features and advantages of the invention will become apparent from a consideration of the following detailed description and from the accompanying drawings.

DETAILED DESCRIPTION

Figure 1:
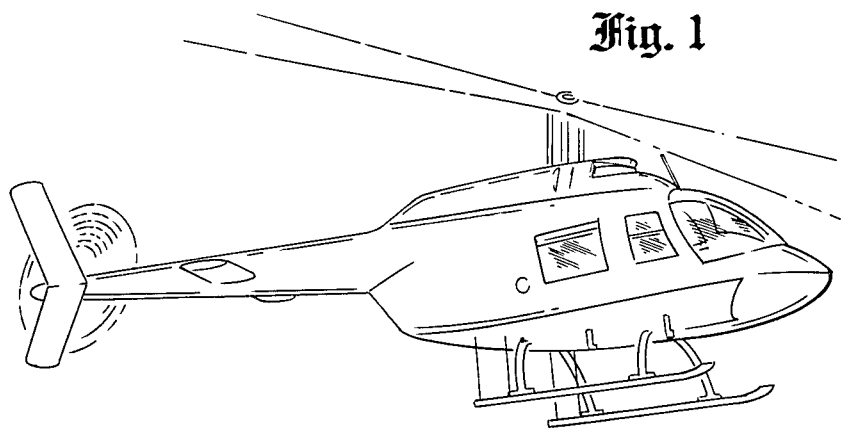
FIGS. 1 and 2 show typical helicopters to which the present invention is applicable.
Figure 2:
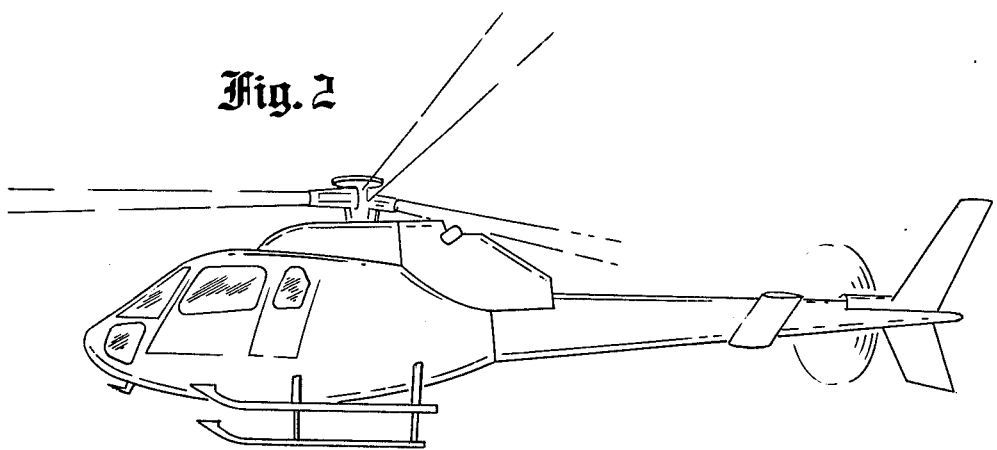

Referring more particularly to the drawings, FIGS. 1 and 2 show two typical helicopters to which the present invention is applicable. While the present system is also applicable to other helicopters, those shown in FIGS. 1 and 2, are the Bell Jet Ranger helicopter, and the Aero Speciale helicopter, respectively.

Figure 3:
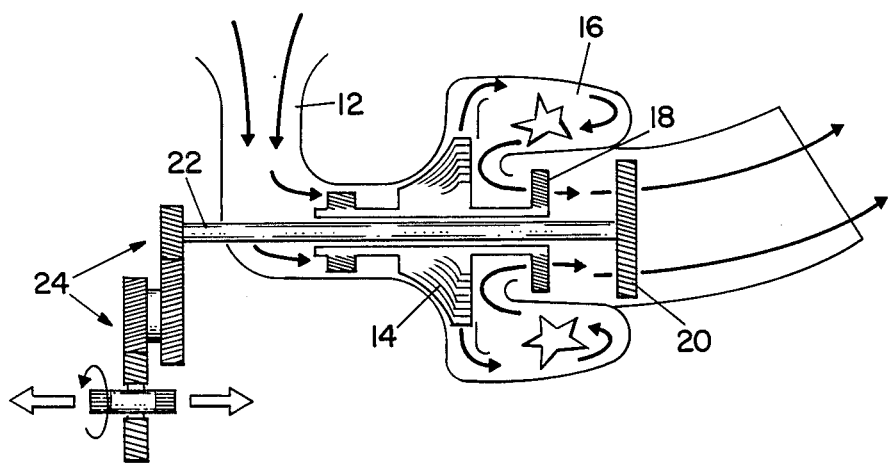
FIG. 3 is a schematic diagram of a free turbine helicopter engine of the type under consideration for controlling, by the present invention.

FIG. 3 is a diagramatic showing of a turbine engine of the free turbine type which is typically used for powering helicopters, such as those shown in FIGS. 1 and 2. In FIG. 3, air is supplied to the helicopter engine through the inlet duct 12 and it is compressed by the compressor section 14 of the engine. The fuel is supplied to the combustion chamber 16 which extends peripherally around the engine. The expanded gases are supplied first to the turbine portion 18 which drives the compressor 14 and then to the power turbine 20 which drives the output power shaft 22 to power the helicopter through a suitable gear train 24.

Figure 4:
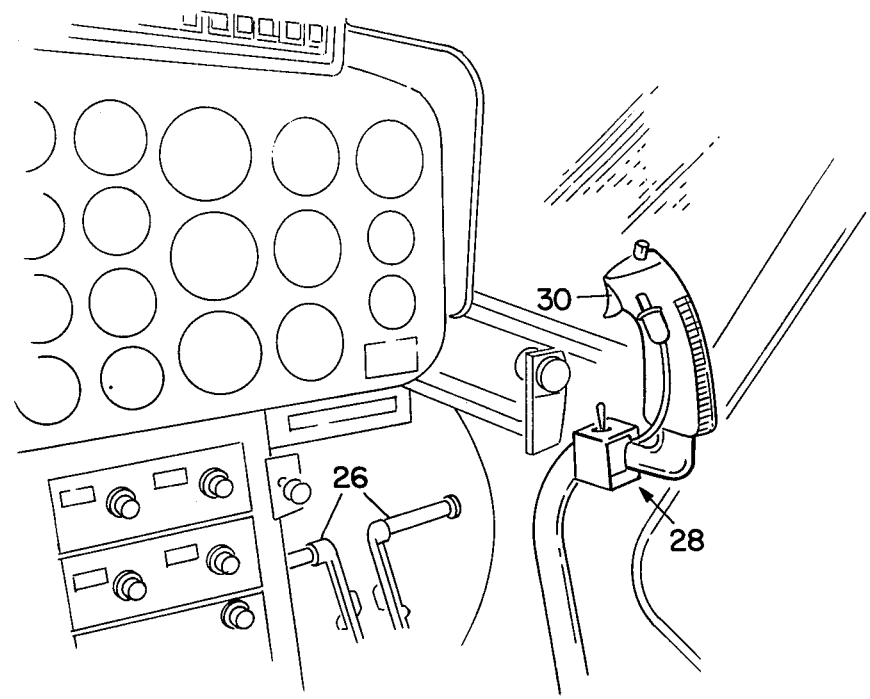
FIG. 4 is a view of a helicopter cockpit showing the cyclic control lever upon which the override actuator is mounted.

FIG. 4 is a partial showing of the inside of a helicopter cockpit indicating the control pedals 26, and the pilot cyclical control lever 28. The lever 28 is employed to control the pitch of the blades of the helicopter which change their angle relative to their longitudinal axis as they rotate, thus controling the direction and speed of flight of the helicopter.

As discussed below, the present invention may include in its implementation only an audible warning, or it may also include automatic fuel control or limiting to prevent overstressing of the helicopter engine as the over-stress limits are approached or exceeded. Such limitation of the fuel flow to the helicopter engine may under certain circumstances be dangerous and accordingly an override switch 30 may be provided to restore manual control and permit the pilot to employ emergency excess powe when needed under emergency conditions.

Figure 5A:
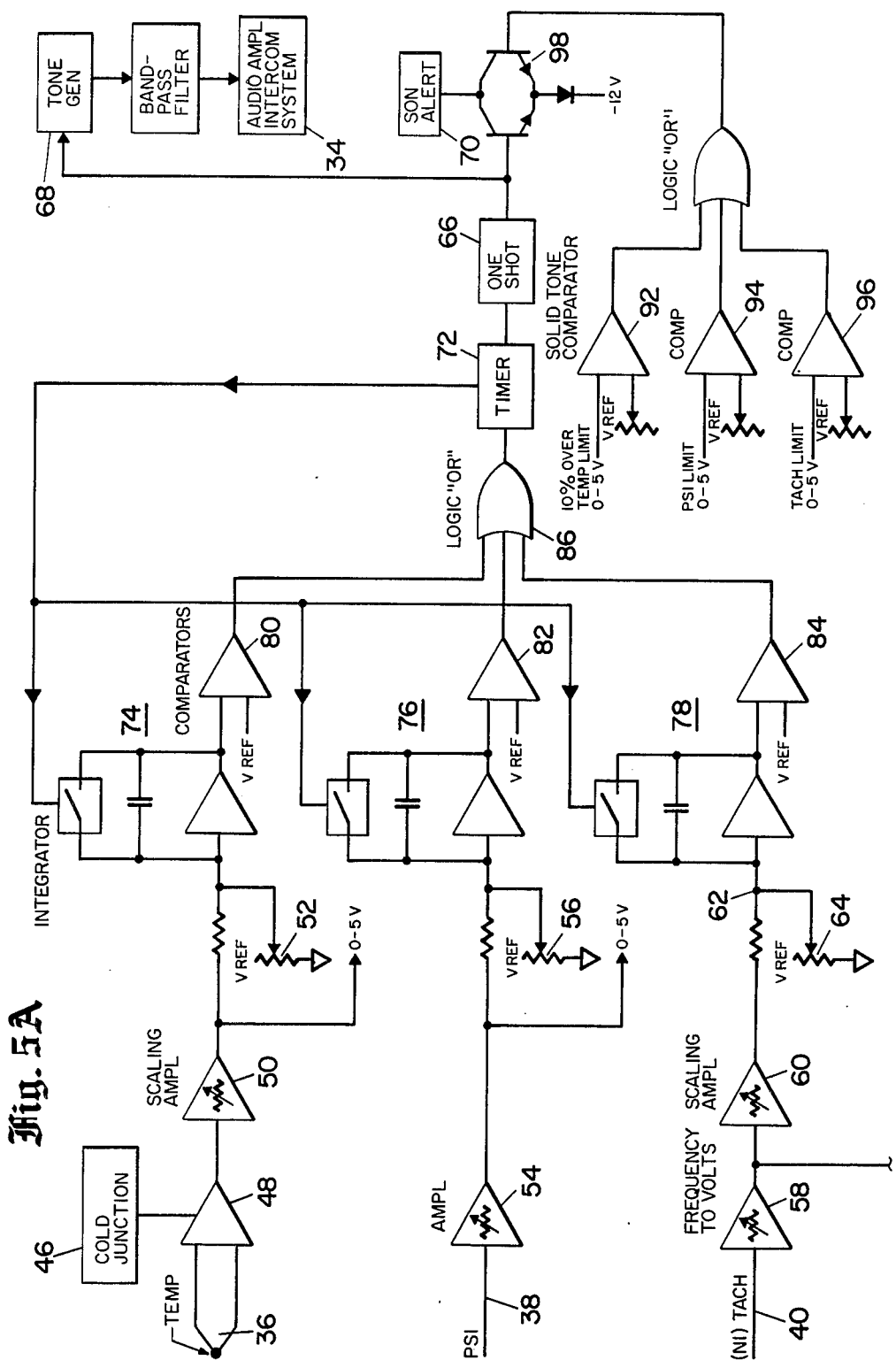
FIG. 5 is a circuit block diagram, illustrating the principles of the invention.
Figure 5B:
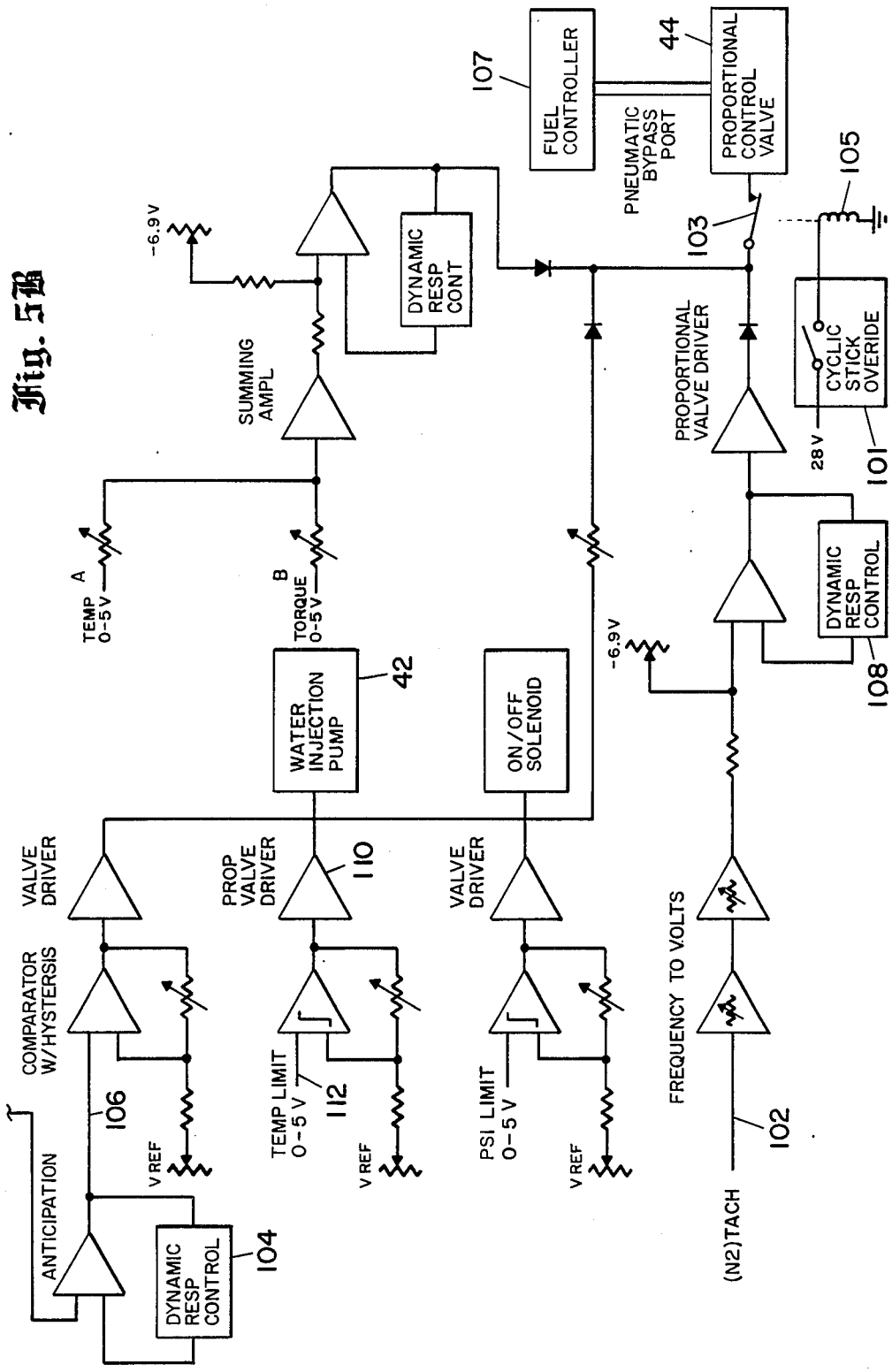

Now, referring to FIGS. 5A and 5B of the drawings, this circuit indicates the overall mode of operation of the system and how the audio alarm 70 is activated or the audio intercom system 34 is supplied with warning signals, when the temperature of the turbine engine as sensed at thermocouple 36 exceeds the predetermined levels, when the torque output of the helicopter engine exceeds predetermined limits as measured by an oil pressure monitor having an input at lead 38, with the oil pressure being sensed at the helicopter drive gearbox, or when the speed of the engine, for example the fan or compressor rotor 14, 18, (See FIG. 3) exceeds predetermined speed limits, as sensed at input lead 40. In addition, water may be automatically injected into the turbine engine as indicated by block 42 in FIG. 5B, or the fuel to the turbine engine may be limited by the proportional control valve 44 which appears at the lower right hand corner of FIG. 5B.

Now, considering the details of the circuit of the FIG. 5A, the cold junction compensation arrangements 46, 48 for thermocouple 36 are conventional and the output from the amplifier 48 is supplied to the scaling amplifier 50. Thus for example, the thermo-couple 36 may be located either at or in the combustion chamber 16 as shown in FIG. 3, or at the output beyond the power turbine 20, and the maximum allowable temperatures at the various points will vary, as well as varying from engine to engine made by different manufacturers, and these variations may be accomodated by the scaling amplifier 50 as well as by the setting of the reference potential by the potentiometer 52.

Similar imput arrangements are provided for the torque input 38, which is provided with an input scaling amplifier 54 and a variable potentiometer 56 to provide an appropriate input reference potential level. With regard to the tachometer input 40, the circuit 58 converts the variable frequencies supplied on lead 40 to a voltage, and this output voltage is supplied to the scaling amplifier 60, which is combined at point 62 with the reference potential supplied from the potentiometer 64. The one-shot multivibrator 66 turns the tone generator 68 or the sonalert 70 on for a predetermined interval of time. Pulses are applied to trigger the one-shot multivibrator 66 from the timer circuit 72 which is operated by the integrator circuits 74, 76, and 78. Depending on the signals supplied from the amplifiers 50, 54, and 60, the intergrators 74, 76, and 78 will charge up their associated capacitors at different rates. When the output from the integrators reach predetermined levels, the comparators 80, 82, and 84 will provide output pulses to the or circuit 86 which will be transmitted through the timer circuit 72 to the multivibrator 66 and will operate to provide a sound pulse from the "Sonalert" sound generator 70, or into the intercom system 34, or both. As the temperature, torque, or speed of rotation limits are approached, the input voltages will increase, and the integrators will provide increased signals to the comparators at a more rapid rate, so that the one-shot multivibrator 66 is operated more frequently and the output tone becomes increasingly more frequent and energized for a larger percentage of the time. In addition, the solid tone comparators 92, 94, and 96 serve to operate the transistor 98 to provide a solid or continuous output tone from the sonalert sound generating unit 70 at predetermined over-stress levels, as determined by the input variable resistances.

Now, turning to FIG. 5B, in addition to the alarm system or warning system as described above in connection with FIG. 5A, a fuel control circuit may also be provided. More specifically, with reference to the proportional control valve 44 which appears at the lower right hand corner of FIG. 5B, this permits the bleeding of air from the normal pneumatically controlled fuel supply to the turbine engine shown hereinabove in FIG. 3. When the proportional control valve 44 is actuated and opened, it serves to bleed air from the normal pneumatic fuel controller 107 and reduce fuel flow, thereby maintaining the helicopter operation below the limits mentioned hereinabove, relative to temperature, torque, and speed. Further, in addition to control of the speed of the power turbine, as indicated by N1 in FIG. 5A, the speed of the fan or the compressor portion of the twin spool turbine engine of FIG. 3 may be used as an additional control factor. This is indicated by the N-2 input 102 at the lower left hand corner of FIG. 5B.

The fuel controller 107 may for example be a Bendix pneumatic fuel controller. The proportional valve 44 is biased to the closed state where no air is bled through the pneumatic connection to fuel controller 107, and the fuel controller is not affected by the circuit of FIG. 5B. However, as current is supplied through relay contacts 103 to the control valve 44, it is partially opened, and bleeds air from fuel controller 107, thereby reducing fuel flow. As mentioned above, when the override switch 101 is closed relay 105 is actuated to open contacts 103, and proportional valve is fully closed, thus precluding any effect on the fuel controller 107, by the remainder of the circuit of FIG. 5B.

Attention is also directed in FIG. 5B to the dynamic response control circuit 104, which provides a delay in the output response at point 106, when the power rotor speed N1 sensed at lead 40 is suddenly increased. This is important in the case of so called "jump stops", where the rotor blades are employed to assist in stopping the forward movement of the helicopter and their angular velocity about the main helicopter shaft is temporarily increased during such stop. In order to block the undesired controling action which might otherwise occur on lead 106, a delay circuit, or a dynamic response control circuit is employed. A similar dynamic response control circuit 108 is provided in the circuitry between the N2 or fan input circuit, and the proportional control valve 44. Incidently, the proportional valve driver or amplifier 110 serves to operate the water and/or alcohol injection pump 42 when the temperature sensed at lead 112 exceeds predetermined levels.

The remainder of the circuitry of FIGS. 5A and 5B is generally conventional and therefore will not be discussed further in detail.

Figure 6A:
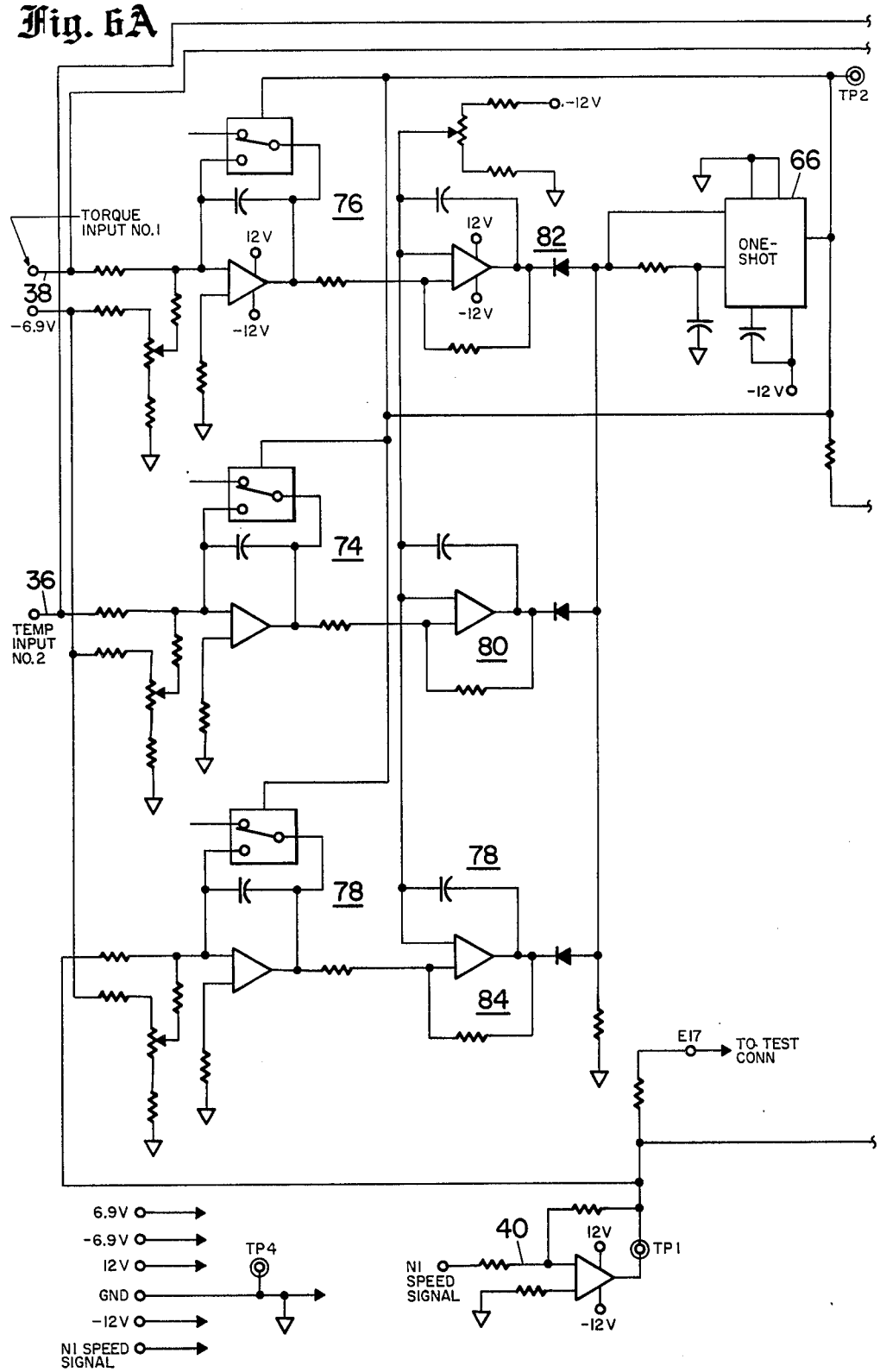
FIG. 6 is a detailed schematic circuit diagram of a portion of the block diagram of FIG. 4.
Figure 6B:
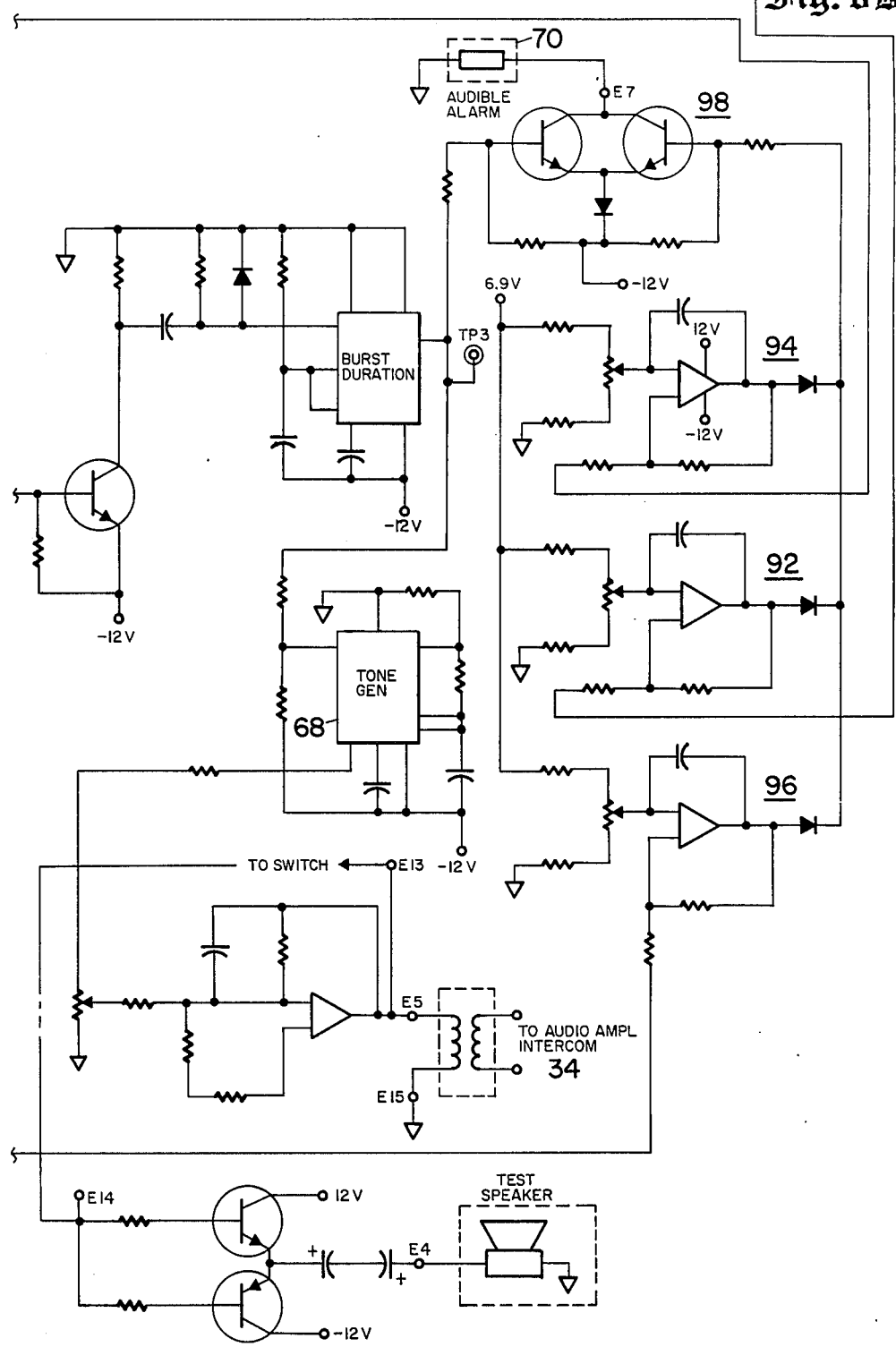

The circuit of FIG. 6A and 6B is a somewhat more detailed electronic circuit diagram of the circuit of FIG. 5A. However, the detailed circuit implementation of FIGS. 6A and 6B is generally conventional, and its mode of operation would be obvious to those skilled in the art from the discussion of FIGS. 5A and 5B, and the showings included in FIGS. 6A and 6B. Accordingly, the details of this circuit will not be elaborated. Incidentally, many of the inputs and key circuits as shown in FIG. 5A bear similar reference numerals in FIGS. 6A and 6B.

Figure 7:
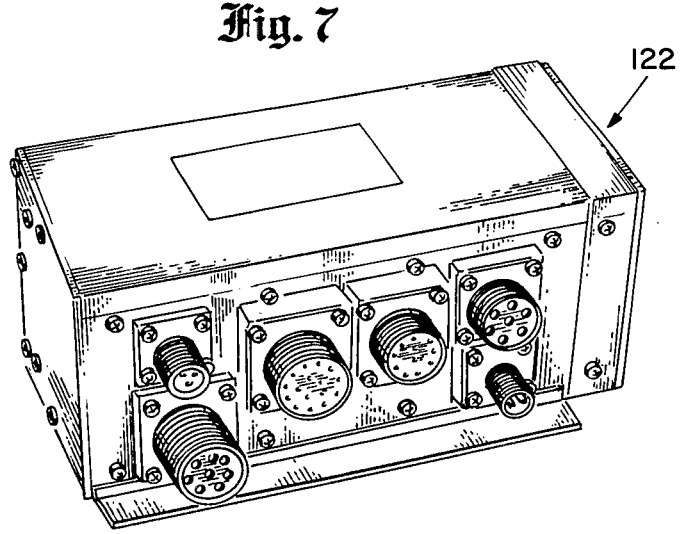
FIG. 7 shows a typical metal electronic system box with appropriate electrical connectors, which may be employed to house the system of the present invention.

FIG. 7 is a showing of a metallic box 122 of the type which has actually been employed to house circuitry as shown in FIGS. 5A and 5B for the control of a proportional control valve 44 (See FIG. 5B) and to actuate alarm circuitry of the type shown in FIG. 5A.

To give a more complete picture of the need for the present invention, it is noted that the inventor is a helicopter pilot, and the present invention is a solution to certain problems encountered by helicopter pilots. More specifically, a helicopter pilot is periodically requested to lift a heavy load from a location where the quarters are relatively confining or cramped. This raises the double problem of a heavy load which will tend to over-stress the aircraft engine unless care is used, and the additional problem that the helicopter pilot's attention must be directed to avoiding obstacles and the like. Accordingly, there is considerable potential for overstressing the engine because the pilot cannot keep his eye on the cockpit instrumentation where the high temperature or other factors would be indicated. Thus, as a result of a few moments in which this type of condition might last, an engine might be severely damaged so that very expensive overhaul or replacement of the engine might be required. Engine failure might even occur. The present invention, with its audio alarm arrangements, permits the helicopter pilot to be aware of the overstressing of the engine, and permits the pilot to override the power limits where necessary for safety and/or survival.

It is recognized that warning systems have been proposed heretofore for fixed installations involving turbines, see U.S. Pat. No. 4,115,998 to K. E. Gilbert, et al, and No. 4,218,878 to R. W. Kiscaden, et al. However, these fixed installation cycle control, or on-off alarm circuits relate to much different systems and problems from those of the helicopter system of the present invention.

In conclusion, the preferred embodiment of the invention has been described hereinabove in connection with the showing of a specific illustrative circuit and other arrangements in the drawings. It is to be understood, however, that the present invention could be implemented by other circuit arrangements instead of those shown hereinabove. Also, the warning system could be employed without the automatic fuel control arrangements, and vice-versa. In addition, instead of using the Sonalert signaling unit, a dedicated loudspeaker and audio system could be used for warning signal purposes in the helicopter cockpit. Accordingly, the present invention is not limited to that precisely as shown and described hereinabove.

What is claimed is:

1. A helicopter turbine engine over-stress warning and protection system comprising:
 a helicopter;
 a helicopter turbine engine mounted in said helicopter to power the helicopter;
 means for sensing at least one critical operating parameter of said helicopter engine, such as the temperature, output torque or engine speed of rotation;
 means including an audio signal system for warning the helicopter pilot of incipient engine over-stressing conditions relating to at least one helicopter engine operating parameter, said means including audio output means, and circuit means for initiating operation of said audio signal output means to produce an initial warning signal when the over-stress conditions are a predetermined level below allowable limits, and for increasing the audio output and therefore the urgency of said audio warning signal as the limits, are approached;
 the system further including means for automatically limiting fuel flow to the helicopter engine to avoid overstressing thereof; and
 override actuation means for disabling said limiting means and permitting increased fuel flow to the helicopter engine under emergency conditions;
 whereby a helicopter pilot may be warned of dangerous engine stressing conditions despite preoccupation with helicopter maneuvering matters.

2. A system as defined in claim 1 further including means for injecting water and/or alcohol into the helicopter engine as overstress limits are approached.

3. A helicopter turbine engine over-stress warning and protection system comprising:
 a helicopter;
 a helicopter turbine engine mounted in said helicopter to power the helicopter;
 means for sensing the temperature of said helicopter engine;
 means for sensing the output torque from the helicopter engine;
 means for sensing the speed of rotation of the turbine engine;
 means including an audio signal system for warning the helicopter pilot of incipient engine over-stress conditions relating to helicopter engine temperature, torque or speed, said means including audio tone signal output means, and circuit means for initiating operation of said audio tone signal output means to produce an interrupted signal when the over-stress conditions are at a predetermined warning level immediately below allowable limits, and for increasing the audio output, including the intensity, frequency or duration of said audio signal as the limits are approached; whereby a helicopter pilot may be warned of dangerous engine stressing conditions despite preoccupation with helicopter maneuvering matters;
 means for automatically limiting fuel flow to the helicopter engine to avoid overstressing thereof;
 means mounted on the cyclic control of the helicopter for disabling said limiting means and permitting increased fuel flow to the helicopter engine under emergency conditions; and
 means for injecting water and/or alcohol into the helicopter engine as overstress limits are approached.

4. A helicopter turbine engine over-stress warning and protection system comprising:
 a helicopter;
 a helicopter turbine engine mounted in said helicopter to power the helicopter;
 means for sensing the temperature of a helicopter engine;
 means for sensing the output torque from the helicopter engine;
 means for sensing the speed of rotation of the turbine engine;
 means including an audio signal system for warning the helicopter pilot of incipient engine over-stressing conditions relating to helicopter engine temperature, torque or speed, said means including audio output means, and circuit means for initiating operation of said audio signal output means to produce an initial warning signal when the over-stress conditions are a predetermined level below allowable limits, and for increasing the audio output and therefore the urgency of said audio warning signal as the limits are approached;

the system further including means for automatically limiting fuel flow to the helicopter engine to avoid overstressing thereof; and override actuation means mounted on the cyclic control of the helicopter for disabling said limiting means and permitting increased fuel flow to the helicopter engine under emergency conditions;

whereby a helicopter pilot may be warned of dangerous engine stressing conditions despite preoccupation with helicopter maneuvering matters.

5. A system as defined in claim 4 further including means for injecting water into the helicopter engine as overstress limits are approached.

6. A system as defined in claim 1 wherein said audio output means includes means for applying warning signals to the helicopter intercom system.

7. A system as defined in claim 1 wherein said audio output means includes means for generating an audio signal to be heard throughout the helicopter cockpit area.

8. A helicopter turbine engine over-stress warning and protection system comprising:
   a helicopter;
   a helicopter turbine engine mounted in said helicopter to power the helicopter;
   means for sensing the temperature of said helicopter engine;
   means for sensing the output torque from the helicopter engine;
   means for sensing the speed of rotation of the turbine engine;
   means including an audio signal system for warning the helicopter pilot of incipient engine over-stressing conditions relating to helicopter engine temperature, torque or speed, said means including audio tone signal output means, and circuit means for initiating operation of said audio tone signal output means to produce an interrupted signal when the over-stress conditions are in the order of five to ten percent below allowable limits, and for increasing the audio output including the intensity or duration of said audio signal as the limits are approached;
   the system further including means for automatically limiting fuel flow to the helicopter engine to avoid overstressing thereof; and
   override actuation means mounted on the cyclic control of the helicopter for disabling said limiting means and permitting increased fuel flow to the helicopter engine under emergency conditions;
   whereby a helicopter pilot may be warned of dangerous engine stressing conditions despite preoccupation with helicopter maneuvering matters.

9. A system as defined in claim 8 further including means for injecting water into the helicopter engine as overstress limits are approached.

10. A system as defined in claim 8 further including dynamic response control circuitry for coupling the turbine engine speed signal to the warning means for avoiding false over-stress indications which might otherwise occur as a result of helicopter maneuvers, such as jump stops or the like.

* * * * *